(12) United States Patent
Leishman et al.

(10) Patent No.: US 7,707,140 B2
(45) Date of Patent: Apr. 27, 2010

(54) INFORMATION RETRIEVAL SYSTEM AND METHOD EMPLOYING SPATIALLY SELECTIVE FEATURES

(75) Inventors: Peter Leishman, Grandvillard (CH); Peter Forth, St. Thomas (BB); John Stewart, Roseneath (CA)

(73) Assignee: Yahoo! Inc., Sunnyvale, CA (US)

( * ) Notice: Subject to any disclaimer, the term of this patent is extended or adjusted under 35 U.S.C. 154(b) by 853 days.

(21) Appl. No.: 10/267,557

(22) Filed: Oct. 9, 2002

(65) Prior Publication Data
US 2004/0073538 A1 Apr. 15, 2004

(51) Int. Cl.
G06F 7/00 (2006.01)
G06F 17/30 (2006.01)
(52) U.S. Cl. .......................................... 707/3; 707/100
(58) Field of Classification Search ............... 707/1–10, 707/100–102, 104.1, 200–201; 701/200, 701/208, 206; 705/26, 27; 709/203, 217; 379/218.01; 455/433
See application file for complete search history.

(56) References Cited

U.S. PATENT DOCUMENTS

| | | | |
|---|---|---|---|
| 5,513,110 A * | 4/1996 | Fujita et al. ............... | 701/207 |
| 5,566,292 A * | 10/1996 | Krembs ................. | 345/442 |
| 5,659,732 A | 8/1997 | Kirsch | |
| 5,717,923 A | 2/1998 | Dedrick | |
| 5,724,424 A | 3/1998 | Gifford | |
| 5,724,521 A | 3/1998 | Dedrick | |
| 5,724,524 A | 3/1998 | Hunt et al. | |
| 5,748,954 A | 5/1998 | Maudlin | |
| 5,752,238 A | 5/1998 | Dedrick | |
| 5,768,521 A | 6/1998 | Dedrick | |
| 5,794,210 A | 8/1998 | Goldhaber et al. | |
| 5,826,241 A | 10/1998 | Stein et al. | |
| 5,848,397 A | 12/1998 | Marsh et al. | |
| 5,848,407 A | 12/1998 | Ishikawa et al. | |
| 5,852,820 A | 12/1998 | Burrows | |
| 5,855,008 A | 12/1998 | Goldhaber et al. | |
| 5,864,845 A | 1/1999 | Voorhees et al. | |
| 5,864,846 A | 1/1999 | Voorhees et al. | |
| 5,893,093 A | 4/1999 | Wills | |
| 5,903,882 A | 5/1999 | Asay et al. | |
| 5,918,014 A | 6/1999 | Robinson | |
| 5,920,854 A | 7/1999 | Kirsch et al. | |

(Continued)

FOREIGN PATENT DOCUMENTS

EP 1 072 987 A1 1/2001

(Continued)

OTHER PUBLICATIONS

Communication from corresponding Australian Patent Application No. 2002233085, dated Nov. 16, 2004, 1 page.

(Continued)

*Primary Examiner*—Miranda Le
(74) *Attorney, Agent, or Firm*—Brinks Hofer Gilson & Lione (57) ABSTRACT

A geo-coded database stores advertiser records which include location information. Received search requests are matched with database records based on location information in the search requests and the record location information. In this manner, a user can search for information on a local basis and receive only the most relevant local search results.

17 Claims, 5 Drawing Sheets

U.S. PATENT DOCUMENTS

| | | | |
|---|---|---|---|
| 5,920,859 A | 7/1999 | Li | |
| 5,930,474 A | 7/1999 | Dunworth et al. | |
| 5,930,699 A * | 7/1999 | Bhatia | 455/456.3 |
| 5,938,721 A * | 8/1999 | Dussell et al. | 701/211 |
| 6,006,218 A * | 12/1999 | Breese et al. | 707/3 |
| 6,078,866 A | 6/2000 | Buck et al. | |
| 6,101,496 A * | 8/2000 | Esposito | 707/6 |
| 6,108,650 A * | 8/2000 | Musk et al. | 707/4 |
| 6,195,611 B1 * | 2/2001 | Sakamoto et al. | 701/209 |
| 6,202,023 B1 * | 3/2001 | Hancock et al. | 701/201 |
| 6,296,361 B1 | 7/2001 | Davis et al. | |
| 6,336,072 B1 * | 1/2002 | Takayama et al. | 701/200 |
| 6,363,392 B1 * | 3/2002 | Halstead et al. | 707/102 |
| 6,452,498 B2 * | 9/2002 | Stewart | 340/573.1 |
| 6,583,716 B2 * | 6/2003 | Rangarajan et al. | 340/7.56 |
| 6,611,751 B2 * | 8/2003 | Warren | 701/200 |
| 6,650,998 B1 * | 11/2003 | Rutledge et al. | 701/211 |
| 6,675,165 B1 * | 1/2004 | Rothschild | 707/10 |
| 6,691,114 B1 * | 2/2004 | Nakamura | 707/10 |
| 6,714,664 B2 * | 3/2004 | Kambe et al. | 382/113 |
| 6,816,779 B2 * | 11/2004 | Chen et al. | 701/200 |
| 6,819,267 B1 * | 11/2004 | Edmark et al. | 340/988 |
| 6,825,805 B2 * | 11/2004 | Rowitch | 342/357.15 |
| 6,847,883 B1 * | 1/2005 | Walmsley et al. | 701/200 |
| 7,076,741 B2 * | 7/2006 | Miyaki | 715/837 |
| 7,130,406 B2 * | 10/2006 | Pines et al. | 379/218.01 |
| 2001/0003443 A1 * | 6/2001 | Velazquez et al. | 342/367 |
| 2002/0000999 A1 * | 1/2002 | McCarty et al. | 345/764 |
| 2002/0002552 A1 * | 1/2002 | Schultz et al. | 707/3 |
| 2002/0004735 A1 | 1/2002 | Gross | |
| 2002/0035432 A1 * | 3/2002 | Kubica et al. | 702/5 |
| 2002/0077084 A1 * | 6/2002 | Zellner et al. | 455/414 |
| 2002/0080063 A1 * | 6/2002 | Bloebaum et al. | 342/357.1 |
| 2002/0126701 A1 * | 9/2002 | Requena | 370/469 |
| 2002/0143462 A1 * | 10/2002 | Warren | 701/200 |
| 2002/0145620 A1 * | 10/2002 | Smith et al. | 345/712 |
| 2003/0014286 A1 * | 1/2003 | Cappellini | 705/5 |
| 2003/0033273 A1 * | 2/2003 | Wyse | 707/1 |
| 2003/0059091 A1 * | 3/2003 | Kambe et al. | 382/113 |
| 2003/0060197 A1 * | 3/2003 | Benes et al. | 455/433 |
| 2003/0083073 A1 * | 5/2003 | Cossins et al. | 455/446 |
| 2003/0200139 A1 * | 10/2003 | Yan | 705/14 |

FOREIGN PATENT DOCUMENTS

| | | |
|---|---|---|
| JP | 9-330329 A | 6/1996 |
| JP | 10-162031 A | 11/1997 |
| JP | 11-174951 A | 12/1997 |
| JP | 2001-5764 A | 6/1999 |
| JP | 2001-22767 A | 7/1999 |
| WO | WO 99/20486 | 9/1999 |
| WO | WO 99/48028 | 9/1999 |
| WO | WO 00/16218 | 3/2000 |
| WO | WO 00/41090 | 7/2000 |
| WO | WO 02/065331 A3 | 8/2002 |

OTHER PUBLICATIONS

Communication from corresponding Canadian Patent Application No. 2,406,946, dated Nov. 10, 2004, 3 pages.

Communication from corresponding European Patent Application No. 02700075.1, dated Dec. 16, 2004, 4 pages.

Govindarajan, Jayesh et al., "Geo Viser-Geographic Visualization of Search Engine Results", *IEEE*, 1999, pp. 269-273.

"Method for Generating Location-Specific Internet Application Content", 1999, No. XP-000889180, 1 page.

Search Report for corresponding Patent Cooperation Treaty application No. PCT/CA02/00144, dated Jul. 24, 2003, 10 pages.

Database of Corporate ResourceNet, "New Service Puts An Auction Search Engine Under One Roof", Electronic Advertising & Marketplace Report, vol. 12, Issue 8, Apr. 1998, p. 6.

Espe, "Online Search Engines Start To Charge For Listings", Washington Business Journal, vol. 18, Issue 1, May 1999, p. 31.

Dawson et al., "2 Search Sites Narrow Their Parameters", Adweek-Western Edition, vol. 48, Issue 42, Oct. 1998, p. 1.

Database of Corporate ResourceNet, "Bits", from Adweek-Eastern Edition, vol. 40, Issue 14, Apr. 1999, p. 46.

Komando, "Searching For Search Engines—from Dogpile to Deja News", Business First-Colombus, vol. 14, Issue 43, Jun. 1998, p. 46.

Database of Corporate ResourceNet, New services Aim to Boost Efficiency of Search Engines, Electronic Advertising & Marketplace Report, vol. 12, Issue 13, Jun. 1998, p. 6.

Database of Corporate ResourceNet, "Goto.com Chooses Quest's SharePlex(R) for Oracle Software to Ensure Uptime for Business-Critical Web Site", PR Newswire, Jun. 2000.

Database of Corporate ResourceNet, "Capitalist Tool", Time Canada, vol. 151, Issue 8. Mar. 1998, p. 41.

Database of DialogClassic(m), :Homestead Technologies' Continued Success Draws $17.50 Million In second Round of Venture Funding, PR Newswire, Apr. 1999.

"APS Search Tools—Patent Search Client Strategy", by US Patent & Trademark Office, Sep. 1997.

"Frequently Asked Questions NT Image Search & Retrieval (IS &R)", by US Patent & Trademark Office, Dec. 1997.

"Chapter 1-Introduction to Dialog", by Dialog Information Service, Inc. pp. 1-1 to 1.14.

"Automated Patent System (APS) Workstation Reference Manual", by US Patent & Trademark Office, Jul. 1996.

Frentzen, Jeff, "Help for Getting the Word Out About Web Sites", PC Week, v14, n46, p. 27(1), Nov. 3, 1997.

Miller, Karen L., "Improve Your Ranking (Building Web Sites to Attract Web Searches)", Home Office Computer, v16, n1, p. 51(2) Jan. 1998.

Wingfiled, "Another Engine Takes Ads By The Click", from http://www.news.com?news/Item/0.4.1387,00/html, May 1996.

Pelline, "New Search Engine Goes Commercial", by CNET News.com, Feb. 1998.

Wang, "Engines Battle Irrelevance of Results-New Search Service Hope To Fill The Void", by Internet World, Feb. 1998.

Vondr Haar, "Searching For The Highest Bidder", from Inter@active week.

Riedman, "Search Engine Startup To Auction Listings", from Interactive-Advertising, Feb. 1998.

Rich, "New Search Engine Allows Sites To Pay Their Way to Top", from http://www.adweek.com/iq/iqnews02.asp.

Mardesich, "Web Site Operators Pay for Top Billing-Search Engine Allows Site Sponsors to Buy Place On Special List", from Knight Ridder Newspapers, Mar. 1998.

Hilty, "GoTo.Hell-What Happens When On Line Search Engine Accepts Cash From Web Sites?" from http://www.ocweekly.com/link/archives/97/27/byte-3.11.98-1.html, Mar. 1998.

Flynn, "With GoTo.com's Search Engine, the Highest Bidder Shall Be Ranked First", by the New York Times, Mar. 1998.

Clark, "Start-Up Plans Internet Search Service Tying Results To Advertising Spending", from the Wall Street Journal, Feb. 1998.

"Going, Going . . . ", from A Closer Look of the Wall Street Journal-Marketplace, Apr. 1998.

"Coursey.com", David Coursey's Insider report on Personal Computing, the Internet and Communications, Mar. 1998.

Glaser, "Who Will GoTo.com", from OnlinePress.com, Feb. 1998.

Mardesic, "Search Engine Charges Hit Sites", from http://www.sjmercury.com/business/center/goti022198.html, Feb. 1998.

"News Watch About Search Engines", from http://searchenginewatch.com/ness.html, Feb. 1998.

Wang, "Engines Battles Irrelevence of Results", from Internet World.

Swartz, "Browser Only Lists Paying Web Sites Critics Fear Approach Will Squeeze Out Most Small Internet Players", from http://www.sfgate.com/cgi-bin/ publish on San Francisco Chronicle, Feb. 1998.

McWilliams, PC World Online, Feb. 23, 1998, "Search Engine To Sell Top Positions On Results Lists", from http://www.pcworld.com/news/daily/data/ 0298/....html.

"Search Engine Start Up To Auction Listings", from http://www.adage.com/interactive/daily/index/html, Feb. 1998.

Alyson, "Searching The Search Engines", from Bacon's, May 1998.

Pelline, "Pay-for-placement gets another shot", from http://www.newscom.?news/item/0,4,19307,00.html, Sep. 1997.
IBM Technical Disclosure Bulletin, "Organizing A Ranked List of Search Matches", Nov. 1994.
Jeffrey Brewer, ClickZ Today, Aug. 18, 1998, "Pay-For-Performance: Creating More And Better Value", obtained at the internet address http://www.clickz.com, Aug. 18, 1998.
Jesse Berst, ZDNet, Aug. 17, 1998, "Search Sites' Shocking Secret", obtained at the internet address http://www.zdnet.com/anchordesk/story/story_2432.html, Aug. 17, 1998.
Sara Fisher, "Budding Internet Firm Finds Niche in Satisfaction", L.A. Business Journal, Aug. 10, 1998.
"Disclosure Rules", The Industry Standard—The Newsmagazine of the Internet Economy, Aug. 10, 1998.
G. David Doran, "Pay to Play", Entrepreneur, Jul. 1998, p. 18.
Advertising Age-Interactive Daily Homepage; obtained at the internet address http://www.adage.com/interactive/daily/index.html, Jun. 8, 1998.
Kim Komando, "With About 320 Million Sites, Search Engines Offer Some Help", copyright 1998, Los Angeles Times Syndication.
Margot Williams, "How To Ease Your Online Searches", Lansing State Journal, Jun. 1, 1998.
"GoTo.com Gets Venture Funding", Internet World Magazine, Jun. 1, 1998.
Sasha Alyson, "Searching The Search Engines", Front Page, May 8, 1998.
Advertising Age-Interactive Daily Homepage, Feb. 23, 1998, "Search Engine Startup To Auction Listings", obtained at the internet address http://www.adage.com/interactive/mdaily/index.html.
Brian McWilliams, PC World Online, Feb. 23, 1998, "Search Engine To Sell Top Positions On Results Lists", obtained at the internet address http://www.pcworld.com/news/daily/data/0298/9880223173204.html.
Jon Swartz, San Francisco Chronicle, Feb. 23, 1998, "Browser Only Lists Paying Web Sites Critics Fear Approach Will Squeeze Out Most Small Internet Players", obtained at the internet address http://www.sfgate.com/cgi-bin/arti...le/archive/1998/02/21/BU102470.DTL.
Nelson Wang, "Engines Battle Irrelevance of Results", from http://www.internetworld,com/print/current/news/19980223-battle.html, Feb. 1998.
Search Engine Watch, Feb. 21, 1998, "GoTo Sells Positions", obtained at the internet address http://www.searchenginewatch.com/news.html, Feb. 23, 1998.
Jodi Mardesich, "Search Engine Charges Hit Sites", from http://wwww.sjmercury.com/businrss/center/goto022198.html, Feb. 1998.
Ken Glaser, Who Will GoTo.com?, OnlinePress.com, Feb. 1998.
Jeff Pelline, "New Search Engine Goes Commercial", from http://www.news.com/News/Item/ 0,4,19281,00.html, Feb. 20, 1998.
"Going, Going . . . ", The Wall Street Journal, Apr. 1998. p. B1.
David Coursey, "Coursey.com", Mar. 1998.
Don Clark, "Start-Up Plans Internet Search Service Tying Results To Advertising Spending", The Wall Street Journal, Feb. 20, 1998.
Laurie J. Flynn, "With GoTo.com's Search Engine, The Highest Bidder Shall Be Ranked First", The New York Times, Mar. 1998, p. C1.
Wyn Hilty, OCWeekly byte marks, "GoTo.Hell", from http://www.ocweekly.com/ink/archives/97/27byte-3.11.98-1.shtml, Mar. 13, 1998.
Jodi Mardesich, "Web Site Operators Pay For Top Billing", The News—Herald (Willoughby, OH), Mar. 2, 1998.
Laura Rich, Adweek Online IQ News Online, Feb. 23, 1998, "New Search Engine Allows Sites to Pay Their Way to Top", from http://www.adweek.com/iq/ iqnews02.asp, Feb. 1998.
Patricia Riedman, "Search Engine Startup To Auction Listings", Advertising Age Magazine, Feb. 23, 1998, p. 34.
Steven Vonder Haar, ZDNet,com, Feb. 19, 1998, "Searching For The Highest Bidder", obtained at the internet address http://www.zdnet.com/intweek/daily/980219i.html, Feb. 23, 1998.
Nelson Wang, "Engines Battle Irrelevance of Results", Internet World, Feb. 10, 1998, p. 1.
Interactive Week Magazine, Garden City, N.Y. May 25, 1998.

Jeff Pelline, "New Search Engine Goes Commerical", CNET News.com, from http://www.news.com/News/Item/0,4,19281,00.html, Feb. 20, 1998.
Nick Wingfield, Staff Writer, CNET News.com, Jun. 21, 1996, "Engine Sells Results, Draws Fire", obtained at the internet address http://www.news.com/News/Item/Textonly/0,25,1635,00.html, Jul. 29, 1999.
Nick Wingfield, Staff Writer, CNET News.com, May 22, 1996, "Another Engine Takes Ads By The Click", obtained at the internet address http://www.news.com/News/Item/0,4,1387,00.html, Jul. 29, 1999.
Rose Aguilar, Staff Writer, CNET News.com, Apr. 29, 1996, "New Ad Model Charges By The Click", obtained at the internet address http://www.news.com/News/Item/0,4,1199,00.html, Jul. 29, 1999.
Alex Lash, Staff Writer, CNET News.com, Dec. 11, 1996, "Open Text Updates Tools", obtained at the internet address http://www.news.com/News/Item/0,4,6118,00.html, Jul. 29, 1999.
"About SearchUP,Inc.", Jul. 15, 1999, obtained at the internet address http://www.searchup.com/about.cfm.
"Testimonials"., Jul. 15, 1999, obtained at the internet address http://www.searchup.com/testimonials.cfm.
"Benefits", Jul. 15, 1999, obtained at the internet address http://www.searchup.com/benefits.cfm.
"Information", Jul. 15, 1999, obtained at the internet address http://www.searchup.com/information.cfm.
"Tips & Tricks", Jul. 15, 1999, obtained at the internet address http://www.searchup.com/tipsandtricks.cfm.
Correspondence from Bryan Buck, President of SearchUp.com, Jul. 7, 1999.
Saul Hansell "Alta Vista Invites Advertisers to Pay for Top Ranking", The New York Times, Apr. 15, 1999, p. C2.
Galore—Super Search Engine, May 21, 1999, obtained at the internet address http://www.galore.com/1/mainframe.shtml.
hitsgalore.com Search Engine, May 21, 1999, obtained at the internet address http://www.hitsgalore.com.
I Seek It "The Next Generation Search Engine", May 21, 1999, obtained at the internet address http://www.iseekit.com.
Correspondence from Emilia F. Cannella to Robert Brahms, CEO of BeFirst Internet Corporation regarding findwhat.com, Jul. 20, 1999.
Correspondence from Emilia F. Cannella to Michael Melcher, MC Services regarding SearchUP.com, Jul. 1, 1999.
Correspondence from Emilia F. Cannella to Robert G. Schuler, Esq., Kegler, Brown, Hill & Ritter regarding iseekit.com, Jul. 1, 1999.
Correspondence from Emilia F. Cannella to Andrew Conru, Vote Publishing regarding galore.com, Jun. 30, 1999.
SearchUP.com—Internet Directory, Automated Bid Placement System, obtained at the internet address http://www.searchup.com/search.cfm, Aug. 25, 1999.
SearchUP: URL Position Manager, obtained at the internet address https://www.securearea.net/searchup/login.cfm, Aug. 25, 1999.
SearchUP: URL Position Manager, obtained at the internet address https://www.securearea.net/searchup/newaccount.cfm, Aug. 25, 1999.
SearchUP: URL Position Manager, obtained at the internet address https://www.securearea.net/getaccount/login.cfm, Aug. 25, 1999.
Correspondence from Emilia F. Cannella to Mr. D. Reed, Reports Galore, regarding hitsgalore.com, Jun. 30, 1999.
Miller, Karen L., "Improve Your Ranking", Home Office Computer, vol. 16, No. 1, Jan. 1998, p. 51(2).
Jeff Fretzen, "Help For Getting The Word Out About Web Sites", PC Week, Vo. 14, No. 46, Nov. 3, 1997, p. 27(1).
Article from the Search Engine Report, "GoTo To Sell Positions", Mar. 3, 1998, http://www.searchenginewatch.com/sereport/9803-to-to-html.
Article from CNET News, "Engine Sells Results, Draws Fire", Jun. 21, 1996, http://www.nees.com/News?Item/0,4,1635,00.html.
Press release on Lightweight Directory Access protocol (LDAP), Netscape Comm. Corp. Mountain View, CA., Apr. 1996.
ClickMail Central directory, circa Apr. 1996.
GoTo.com, circa 1998, at www.goto.com.
Northern Light, circa 1997-98, at sirocco.northernlight.com.

Laura Rich, Adweek Online IQ News Online, Feb. 23, 1998, "New Search Engine Allows Sites to Pay Their Way to Top", from http://www.adweek.com/iq/iqnews02.asp, Feb. 23, 1998.

Smith, Laura B., article "Going . . . Gone", PC Week, vol. 13, No. 34, Aug. 26, 1996, p. E1 (2), http://www.dialog-classic.com/DialogClassic/dialog.

Cliff Kurtzman, "Another Internet Advertising List", Internet Advertising Digest #006, dated Jun. 19, 1996, from http://www.o-a.com/archive/1996/june.0021.html, printed Sep. 28, 2001, 5 pages.

Press Release article titled "GoTo.com Announces First round of Financing, Totaling More Than $6 Million, Led by Draper, Fisher Jurvetson", *Business Wire*, dated May 19, 1998, printed from the Internet at <http://www.dialogclassic.com/main.vingw> on Nov. 9, 2000, 2 pages.

Ubois, Jeff, article titled "He who pays the piper . . . ", *Midrange Systems*, vol. 9, No. 12, 1996, p. 50 (1), reprinted by Cardinal Business Media, Inc.

* cited by examiner

INFORMATION RETRIEVAL SYSTEM AND METHOD EMPLOYING SPATIALLY SELECTIVE FEATURES

CROSS REFERENCE TO RELATED APPLICATIONS

This application claims priority of PCT application number PCT/CA02/00144, having a priority date of Feb. 11, 2002, which claims priority of Canadian patent number 2,335,445, having a priority date of Feb. 9, 2001, which applications are incorporated herein in their entirety by this reference.

BACKGROUND

The present invention relates generally to information retrieval systems, and more particularly to an information retrieval system and method employing spatially selective features.

Although location is a fundamental, unifying principle humans use to organize their "spatial awareness" of the world, the Internet has failed to deliver high performance spatial search and retrieval capabilities.

Traditional means of finding local content have included reading the local newspapers, searching telephone yellow page directories, listening to the radio, spotting billboards, and seeing local TV announcements or advertising. On the Internet today, some local content can be found using 'yellow page' listing services, city content sites, local portals and ISPs.

However, these services offer limited geographic scope and focus mainly on large metropolitan areas. While all of these content sites provide elements of useful information, what is needed is a method to provide a continuum of data across the entire world, and across all categories. As well, it would be advantageous to enable average users to add local content to these databases.

Quickly and easily finding local content on the Internet today is a laborious, convoluted, and inconsistent experience. Internet users are typically required to provide specific Zip code, or other positional information to conduct a search for local content.

Furthermore, in order to find any specific local content, the user has been required to enter a known geographic, postal, or street address to commence a search. This inhibits a user in performing 'real-world' searches where one might not know an address or postal code. A system for finding local content at any point within an international geographic extent has not been possible.

Current Internet mapping and local search capabilities are limited to static data, and are restricted to a delimited geographic area, such as a country, and do not provide an optimal geo-location search range for each record. Typically, searches on the Internet are performed by selecting a predetermined classification of information by sub-category(s). The problem is that the resulting size of the search catalogues often requires time-consuming scanning by users through a myriad of categories and/or a large amount of irrelevant results.

Geographic Information Systems (GIS) have, for many years, provided tools to generate, manipulate, and manage spatial data. Government agencies and commercial data vendors use GIS extensively to create and maintain map data used by location services. Vendors provide street-centerline data sets that include address and street name data, which are essential to geo-coding and routing applications. Location services that incorporate GIS tools enable a wide range of spatial transactions that can be delivered in meaningful ways.

Some commercially available database management systems (DBMS) currently include basic spatial data management capabilities, providing limited support to location services. DBMS's specialize in the storage and management of all types of data including geographic data, and are optimized to- store and retrieve data. Although many GIS's rely on DBMS's for this purpose, they are not competitive in terms of performance, flexibility, and scalability without direct access to a robust GIS at their foundation.

Distributing geographic information via the Internet enables real-time display and integration of data from around the world. A natural extension of a traditional desktop GIS, Internet mapping and associated applications have been popularized by various sites that deliver maps to the end user via a browser. However to date, mapping on the Internet has been mainly a cartographic exercise, with minimal capability for true information searching and adding of new content.

Computer desktop mapping systems use the map paradigm to organize data and user interaction. The focus of such systems is the creation of maps, with the map linked to a database containing related information. However, most desktop mapping systems have limited data management, spatial analysis, or customization capabilities.

Computer Aided Design (CAD) systems have evolved to create designs, and buildings plans. CAD systems require that components with fixed characteristics be assembled to create the whole structure. These systems feature few rules to specify how components can, or should be, assembled and include very, limited analytical capabilities. Although some CAD systems have been extended to support maps, they typically have limited utility for managing and analyzing large geographic databases.

Remote sensing is the art and science of making measurements of the earth using sensors such as GPS receivers, or cameras fitted to aircraft or satellites. These sensors collect data in the form of images and data streams and include specialized capabilities for manipulating, analyzing, and visualizing those images.

For the foregoing reasons, there is a need for an improved information retrieval system and method.

BRIEF SUMMARY

The present invention is directed to an information retrieval system and method employing spatially selective features. The system includes a search interface, a map interface, a results table interface, and a selection tool for selecting a search area. The method includes the steps of providing a search interface, providing a map interface, providing a results table interface, and providing a selection tool for selecting a search area.

In an aspect of the present invention, roll-out map controls are provided to optimize the use of limited display space; view finder control to provide a panning function to the map; and custom spatial driving directions to display a list of routes on the map. In an aspect of the present invention, a geo-enabled messaging and conference module is provided to apply spatial characteristics to each member of a conference or messaging service, and to enable the members to selectively communicate with other members.

The invention removes the barriers to finding local content quickly and easily. The invention solves the problem of requiring specific postal code or other positional information in order to conduct a search for local content by providing simple 'point and click' entry to begin a search anywhere in the World. The invention provides scalability and reliability, delivering comprehensive, targeted and customizable geo-coded local content, based on a user's actual or preferred location anywhere in the World, to any wired or wireless Internet device.

Other aspects and features of the present invention will become apparent to those ordinarily skilled in the art upon review of the following description of specific embodiments of the invention in conjunction with the accompanying figures.

BRIEF DESCRIPTION THE DRAWINGS

These and other features, aspects, and advantages of the present invention will become better understood with regard to the following description, appended claims, and accompanying drawings where:

DETAILED DESCRIPTION OF THE PRESENTLY PREFERRED EMBODIMENTS

Figure 1:
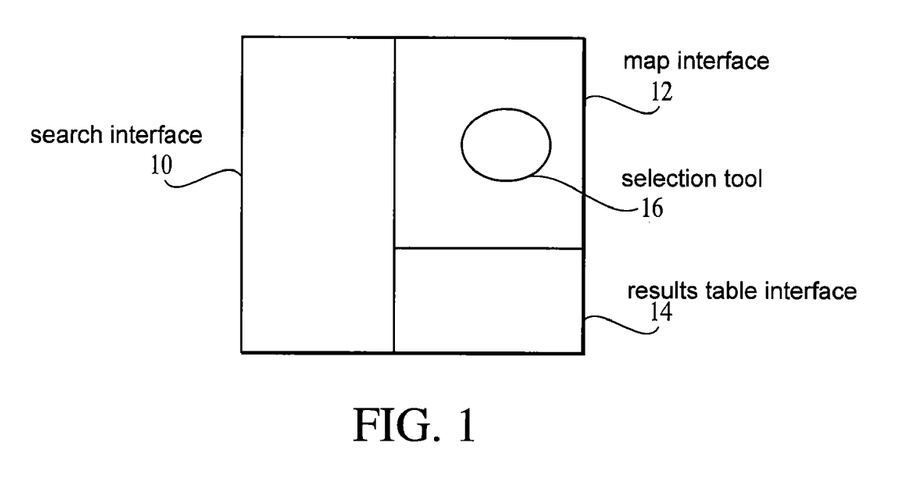
FIG. 1 is an overview of an information retrieval system employing spatially selective features according to an embodiment of the present invention.
Figure 2:
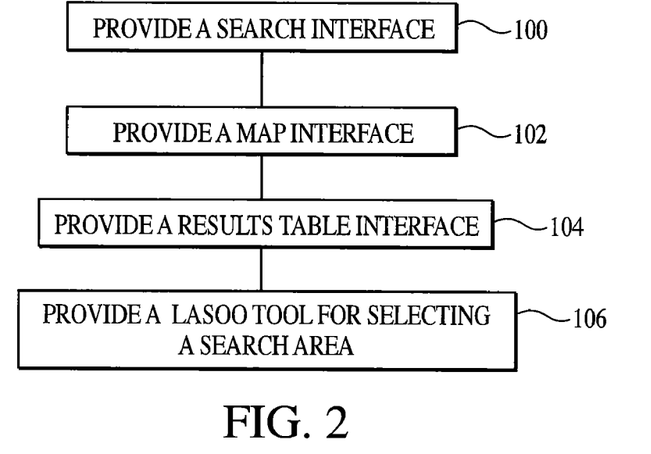
FIG. 2 is an overview of an information retrieval method employing spatially selective features according to an embodiment of the present invention.
Figure 3:
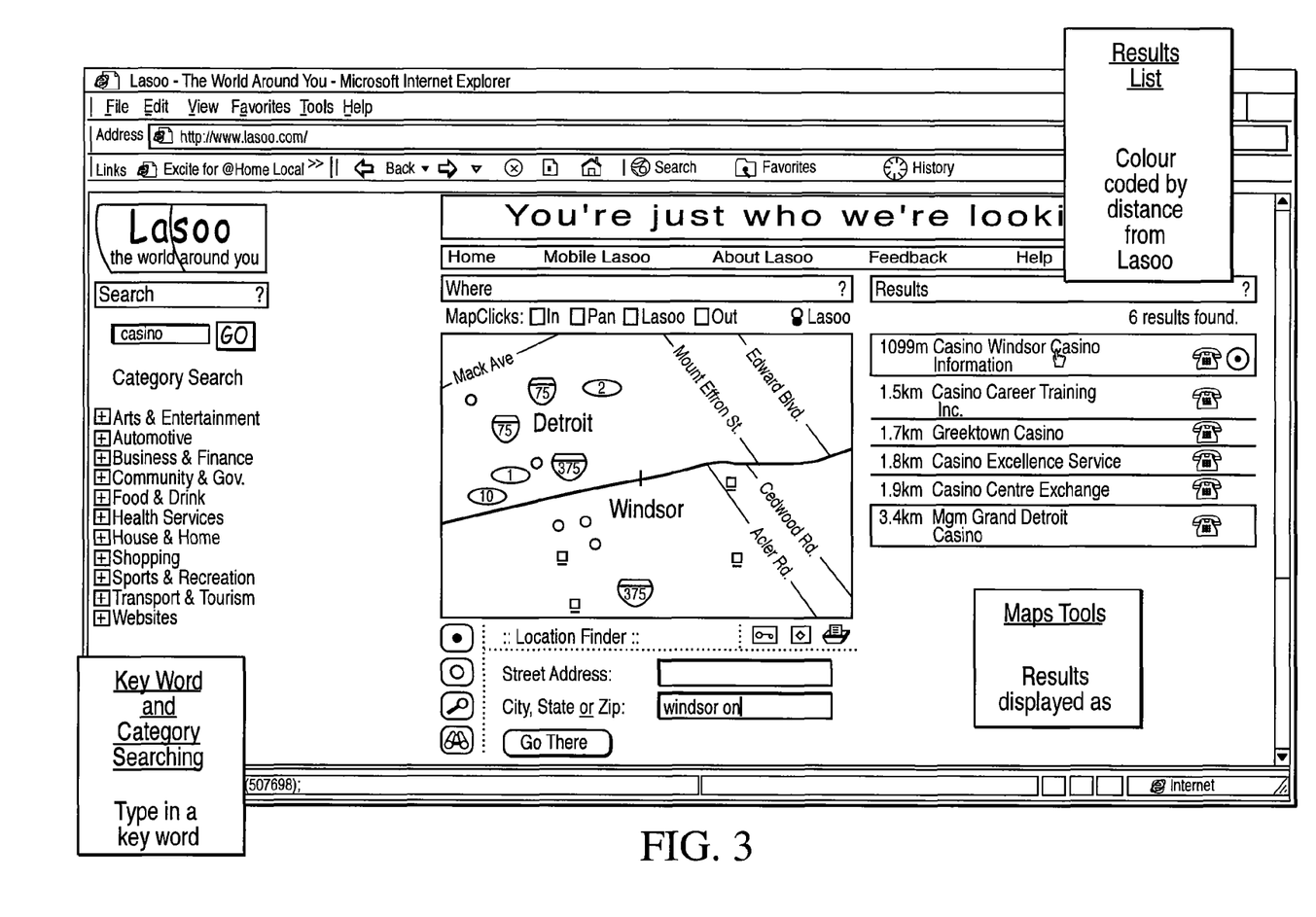
FIG. 3 illustrates a user interface according to an embodiment of the present invention.

The present invention is directed to an information retrieval system and method employing spatially selective features. As illustrated in FIG. 1, the system includes a search interface 10, a map interface 12, a results table interface 14, and a selection tool 16 for selecting a search area. As illustrated in FIG. 2, the method includes the steps of providing a search interface 100, providing a map interface 102, providing a results table interface 104, and providing a selection tool 106 for selecting a search area.

Search Interface

Embodiments of the Search Interface 10 include a Polygon Search Module (PSM), an Internet Database Link Control Module (IDLCM), an Auto Range Determination Module (ARDM), Extended Range Record Module (ERRM) and a Dynamic Filter (DF). As will be described below, various embodiments include various combinations of these modules to provide particular functionality.

The Polygon Search Module (PSM) enables the definition and storage of any geo-spatial polygon, comprising an unlimited number of 'sides' to the polygon, defined by the applicable latitude and longitude co-ordinates of each 'side'. The PSM can be used to define a search area for any point located within the boundary of the polygon.

The PSM includes an Automatic Clipping Engine (ACE) that produces a radial search area, based on the current search position and search range, within which the polygon is a geo-spatial sub-set, then automatically removes or 'clips' any results that lie outside of the polygon, whenever a search based on the defined PSM is made, subject to extension of the searchable area using a Dynamic Search Range Module (DSRM), as described below: The PSM extends the search algorithm of the standard radial search to any geo-spatial polygon, such as any area, region, state, or country.

The invention includes an ability to create maps based on a given longitude/latitude or a city, Zip code, state, or country. Search results are provided in tabular format with a linked map, along with a platform to allow users to add information to a geo-referenced database. All information within the application's database should be tied to a precise longitude and latitude and can be displayed on a variety of scaled, electronic maps over the Internet.

A Dynamic Categories Module (DCM) creates a dynamic set of categories to present to the user dependent on the current map setting. The DCM automatically identifies any non-populated categories for the current map setting. In addition, the DCM performs a spatial count of records within each qualifying category that are encompassed by the current map setting. Thus the user is presented with a qualified list of Categories relative to the specific map setting and each qualified category in the tree structure is displayed along with the number of valid records contained within that Category, where the number shown is inclusive of any 'child' category records.

The DCM provides the principle advantage that the end-user is presented with a manageable, relevant set of categories, as opposed to a much larger, less relevant list, for the map setting that the user has currently selected; thus, making searching much quicker and more effective. Whenever the user selects a new location to begin a search, the DSRM geo-spatially evaluates all data surrounding the specified location, and automatically determines an appropriate default search range to provide search results for this location and range, in all appropriate categories.

In addition, the DSRM is utilized whenever a keyword search is invoked. The DSRM ensures that relevant results are returned, provided relevant data exists at some location geo-spatially. The DSRM ensures the location of the closest set of search results to the user's specified location, no matter what location and range was initially specified by the user for the search.

An Internet Database Link Control Module (IDLCM) takes database content from any DBMS and automatically enables access via the Internet to the information contained in that database, through auto re-direction of search requests emanating from any Internet search engine. The IDLCM automatically directs search requests for any directory listing or category to a local search results page for the desired location and category/reference by means of an IDLCM result link displayed to the user within the search engine's result list. The IDLCM produces this functionality by automatically creating a specific Web page with imbedded meta-tags and other information for each record in the set of records that the database manager wishes to make Internet accessible.

The software automatically directs search requests from any Internet search engine for any search related to the key or index value of a record from the Internet linked database. The IDLCM enables any search engine to create a suitable reference link to the desired database record, enabling the automatic display of this link reference within the search engine's result list. The reference link itself, on the search engine's results list, emanates from the search engine having scanned and indexed the automatically generated database engine stored by the IDLCM on a Universal Resource Locator (URL) and set of Web pages specific to the target database and record. As an example using this methodology, a database of local content information can be provided to all Internet search engines automatically, with the end-user being linked to a relevant site where local content information and appropriate G15 tools are available.

The map frame is where the search location, range and result points are displayed and configured. The display of a Lasoo provides an intuitive range ring on the map. The Lasoo defines the spatial proximity component of a search and is a circle placed on a map with a center, (x, y), and a radius, r. The system displays multiple results on the map as a set of independent 'dots', including a feature that accumulates overlapping results into one 'dot' but enables a user to select from a pop-up window displaying records belonging to the 'dot' when the user clicks on the 'dot'.

In addition, this interface area provides important navigational and search criteria controls such as zooming controls, a location finder or "gazetteer", range or Lasoo' size control, a viewfinder for fine-tuning current location, 'center Lasoo' control, 'place Lasoo' control, and map panning control. Searches are conducted using detailed, high quality, worldwide maps featuring zoom levels down to street-level and a worldwide gazetteer offering city and place names worldwide. The invention automatically links a geo-coded information database with associated Internet Web pages, and provides integrated search and retrieval of information from database and Web simultaneously.

In an embodiment of the present invention, search queries can be initiated either through a direct keyword input or by clicking on any category item. A search query can be conducted either through user keyword input or by selecting from a customized, 'clickable' category tree. Only populated categories appear. Searching can be performed within an information directory and/or a web site.

An Auto Range Determination Module (ARDM) that automatically detects the minimum range (geo-spatial distance) that needs to be set in order to locate and retrieve a minimum, specified number of search results, for a particular set or classification of records stored within a geo-located database, where each record has latitude and longitude attributes. The ARDM is input with the location in latitude and longitude setting, where the search is to commence.

Options within the DCM permit non-populated categories to be omitted from the category search tree or to be presented as 'grayed out', with the further option that unselected categories, if chosen will use the ARDM function to retrieve record(s) for this category by automatically extending the search range appropriately.

In an embodiment of the present invention, the Search Interface further includes an Extended Range Record Module (ERRM) that provides geo-spatial indexing of records beyond a standard containment area and allows for the search and retrieval of such a record for a geo-spatial search commencing at a point and for a range beyond the standard search area availability of the record.

Typically, a search is based on a location and search range or distance. This procedure defines a local content search for information such as businesses and organizations located within the defined search zone. The extended range attributes for any single record can be set and the ERRM will ensure that the record will appear within appropriate geo-spatial searches using any location and range, from 1 meter to worldwide.

However, there are important instances where information and/or records should be 'searchable' for search locations and ranges that do not contain the physical location the information record is tied to. For instance, a Florist A may want to market flowers to anyone searching/residing within a 50 km radius of his store location. If someone was 35 km distant and searching for Florist shops within a 10 km radius, then such a search would not contain Florist A. If one searched within 5 km for a local pet shop and none was found, the invention automatically extends the search further for you until one or more records are found, or a pre-defined threshold has been reached.

In an embodiment of the present invention, a Dynamic Filter (DF) automatically senses a user's profile depending on the user's preferences, the user-specified category filter class, and the category structure returned by the DCM. The category filter class is one of several pre-established sub-sets of the master category structure designed by the system architect to reflect the category interests of specific groups. The DF ensures that all of the user's settings and preferences are applied to the DCM to produce a dynamic, fully customized set of categories for searching based on the current user's map setting.

The parameters of the DSRM can be dynamically altered at the moment the module is invoked, to match the user's preferences in terms of categories of most interest. DSRM parameters can be adjusted to specify range limits and minimum returned result set. In addition, the user may create as many "favorite folders" within which can be recorded details of the current search the user has performed, including retention of specific record result details, all of which can be used to automatically search and retrieve relevant data in future search sessions.

"Cookie" technology can be employed to provide a powerful, more personalized experience by storing information about an individual user's preferences and previous choices. For example, a cookie could hold keyword or category searching criteria and/or user search location information, enabling a business to customize and target delivery of information and advertisements. The invention enables the easy customization of mapping icons and/or the prioritization of results to reflect specific business promotions and sponsor needs. For example, the results may be prioritized according to "top-of-list" promotions, spatial alerts, or pay-per-ad restrictions.

In an embodiment or the present invention, the search interface includes a circle for indicating the area to provide information about. In an embodiment of the present invention, multi-colored circles are provided with equidistant placed concentric rings to form a 'bulls eye' style target, or "Lasoo". Each colored ring forms a concise geographic selection area that increases in physical area as the radius increases. Results found in a particular query appear as dots within these rings.

Map Interface:

The map interface 12 includes a semi-transparent target (STT), an STT Automatic and Dynamic Positioning Module (STTAPM), a Boundary-Subset Module, a Micro Mapping Module, a View Finder control, a Custom Spatial Driving Directions Module (CSDDM) and a Geo-enabled Messaging and Conference Module (GMCM).

A semi-transparent target (STT) is imbedded within each map to provide a visual reference for the user that graphically outlines the search area the user has selected and provides a visual reference for multiple result points that are automatically positioned on the map, so that the user can easily determine visually their relative distance from the center of the search location as well as their distance from each other. The semi-transparent aspect of the STT enables all of the underlying and overlying map details to be readily distinguished. The STT records current geo-position for the device or that selected by the user, along with the currently selected or determined search range, dynamically feeding this data to other software objects.

An STT Automatic and Dynamic Positioning Module (STTAPM) is included to enable a user to click anywhere on the map display to automatically reposition the STT to a point indicated by a mouse pointer. The STTAPM also automatically repositions the STT whenever the user selects a new location from within the gazetteer, or selects a previously used location.

The resulting symbol, typically a dot on the map, is evaluated using a Boundary-Subset Module (BSM) to determine if one or more result points will overlap, causing visual confusion and deterioration of data communication to users. If such a case arises, an incorporated optimizer will select points to combine in order to eliminate overlaps, and size the resulting point to a larger dimension to visually reflect that it represents more than one point.

A detailed page 'pop-up' is provided for any result whenever a user clicks on the applicable record in the results list or on the corresponding 'dot' on the map, without altering the underlying map/results list display. The page pop-up includes a street-level location map showing the precise location of the record, address and contact information; links to the corresponding Web page where applicable, and other text and information, which a record owner may add.

The BSM's parameters are fully adjustable to suit design parameters pertaining to spacing requirements and aesthetics. Since the entire module set is re-computed as a map is drawn, panning, zooming, and/or relocation of map data results in a dynamic re-assessment of the position and size of map result points.

Figure 4:
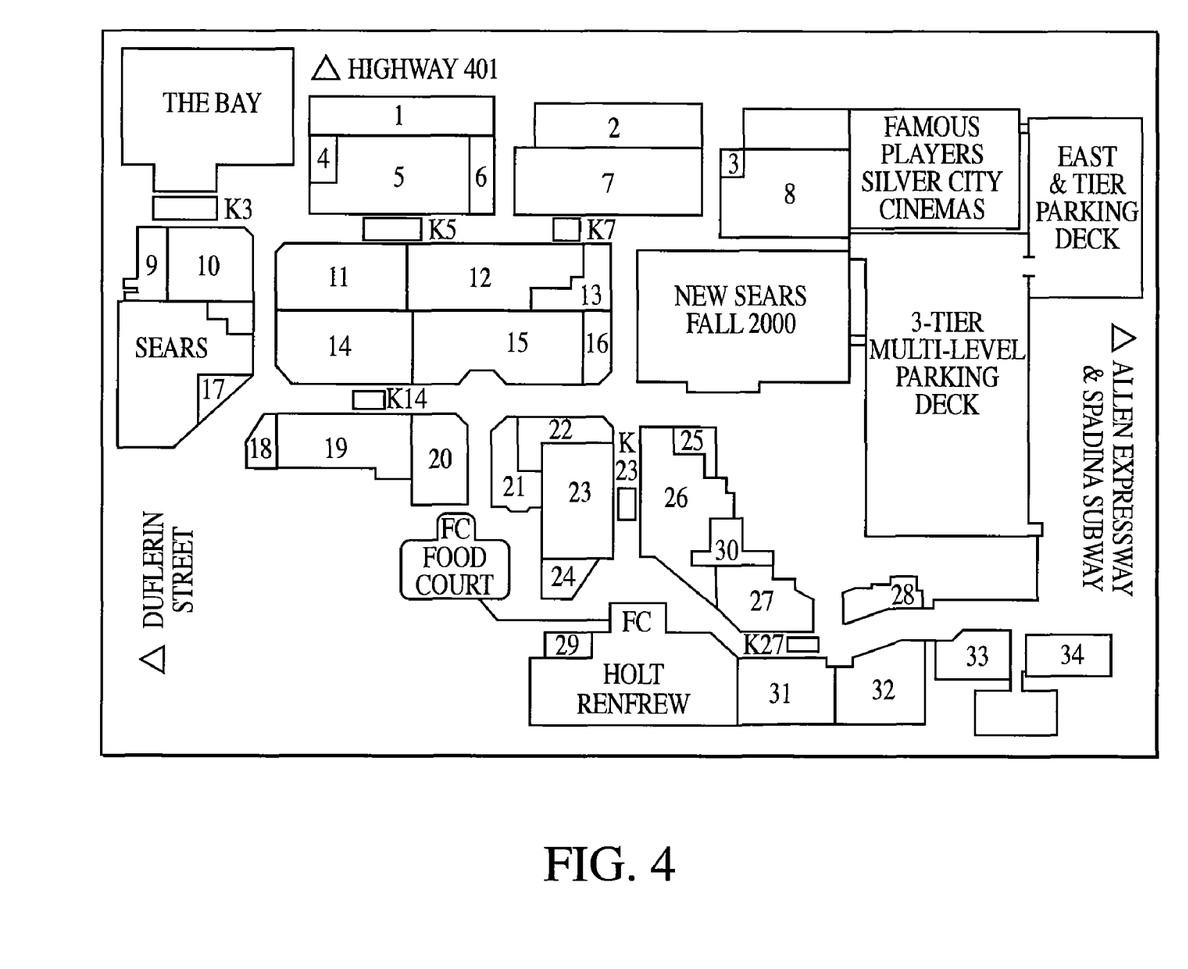
FIG. 4 illustrates an example of a Micro-Map.

As illustrated in FIG. 4, in an embodiment of the present invention, a Micro Mapping Module (MMM) links CAD files or scanned images with geo-spatial positioning controls and map link controls, to provide an integrated view of the interior of buildings and/or high-definition mapping for precise areas such as shopping centers, exhibit centers, fair grounds, manufacturing plants, and park grounds. The MMM enable the precise location of any object or position on the micro map to be determined and displayed to the user. The MMM link control enables a micro map to be integrated within a standard digital street level display, so that a user has a seamless means of 'drilling down' from the digital street map to within the micro map.

In addition, micro map zoom/pan controls enable zooming and panning within the micro map in a completely analogous manner to the zoom/pan controls for the standard digital maps. All map controls such as zoom, pan, range, and location utilize a unique rollout feature called Rollout Map Controls (RPC). When a user clicks on the applicable control, an expanded control feature list window appears to the side of the control. The user can then select from among the expanded list of available features for that control This technique optimizes the use of limited display space and at the same time offers a full set of expanded features without the need to refresh a screen display, since the roll-out control and its embedded feature display list are downloaded and instantly available from the main page the control sits on.

A View Finder control provides a unique means of panning a map. The 'viewfinder' tool enables a user to pan the main map by moving the viewfinder over a rollout index map that features a much larger geographical area than that of the main map. The user moves the viewfinder by pointing and clicking to the new desired position of the viewfinder. At the same moment as the viewfinder moves on the underlying index map, the main map in the map pane refreshes to show the new map determined by the viewfinder control's new position. The map 'viewfinder' tool enables a user to pan the main map by moving a viewfinder control on a rollout index map that features a much larger geographical area than that of the main map.

A Custom Spatial Driving Directions Module (CSD) enables the owner of a database record to record customized driving directions onto a street-level, or other zoom level, map display by specifying a series of linked points on the map simply by clicking with the mouse pointer at the applicable places on the map. The series of linked points then becomes a 'route' on the map. Routes can then be rated according to type, such as quickest, scenic, or walking route.

In addition, the CSD enables the addition of descriptive text by a database record owner in an adjacent text box; explaining the route and adding other useful end-user information. The CSD enables the addition of any number of custom 'driving direction' routes to a map, and to store these custom routes with the applicable database record(s). Further, the CSD provides an end-user interface for selecting from a list of routes.

In an embodiment of the present invention, a Geo-enabled Messaging and Conference Module (MCM) is included that automatically applies spatial characteristics to each member of a conference or messaging service and enables members to selectively communicate with other members within the STT the user has defined. In this manner, members may view the locations of all members, or any desired geographical sub-set of members, on the map display and select on a geo-spatial basis which communications to process.

Results Table Interface:

The Results Table Interface includes a Dynamic Search Results Updating Module (DRUM), a Linked, Rollover Map/List Search Result Highlighting function, and a Roll-out Thumbnail Map & Information function.

The Results Table Interface (RTI) displays the search results in a table format. Each result found in the table is linked to a specific record point (dot) on the map. A user may inspect results by either rolling over a record within the Results Table or by rolling over a record point on the Map. Either procedure will yield a colored 'hot-link' between the mapped result and the table result for a specific record. The RTI displays search results in a list and multi-point map format simultaneously.

Any selected result record occurring in a search area on the map, or 'Lasoo', appears in a Results Table below the map. The results table is color-coded depending on the color Lasoo ring in which a resulting dot is found. Results are displayed normally from nearest to farthest from a Lasoo center. The Results Table further features zymology associated with additional information for each record in the table, a distance field, a listing of tie radial distance from Lasoo center, extended range records, directory/search category labels, 'Next' and 'Back' table review controls, hot-linked row click launch, a hot-linked 'roll-over' map highlighter.

A Dynamic Search Results Updating Module (DRUM) is included for creating automatically updated search results based on the current position of the STT as the user moves or re-sizes the STT controls within the map pane. Whenever a user places the STT in a new position or re-sizes the range of the STT, the DSRUM performs an automatic background update of the search results, and automatically refreshes the search results list.

In an embodiment of the present invention, a user can sort the list according to several alternative criteria. This capability enables the user to sort the search results by several criteria, such as distance, category, and name.

In an embodiment of the present invention, a Linked, Rollover Map/List Search Result Highlighting function provides a feature that when a user rolls over a result dot on a map, or a result row on the Results List, the result dot and row is highlighted. A Roll-out Thumbnail Map & Information (RTMI) function automatically produces a 'thumb-nail' map and other text information related to a result row, and displays this information to one side of the result row whenever the user 'rolls-over' the row with the mouse pointer. This function operates in real-time and is independent of the number of result rows in the results table. The thumbnail map shows the precise street-level map view associated with the address in the applicable result row.

A rollover function enables a user to identify visually the location of any result by 'rolling over' either the result on the result list or by placing the pointer over a result 'dot' on the map. The item being rolled-over automatically highlights by changing color, on the map and the results list simultaneously. A rollover, information expansion function automatically displays additional information for a result whenever the user rolls over the corresponding 'dot' on the map or the row in the results lists. Additional information displayed to the side of the results lists may include a thumbnail street-level locator map, and/or Web link information.

Figure 5:
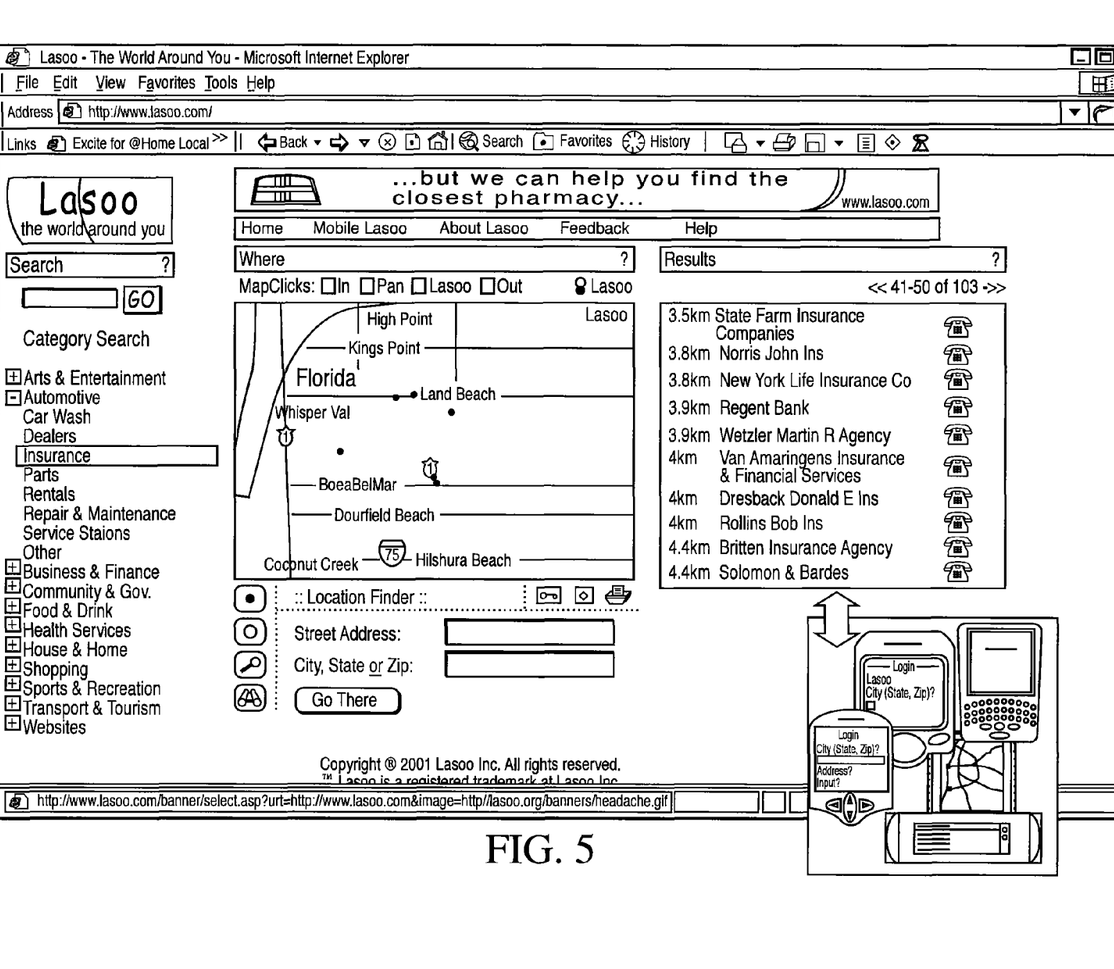
FIG. 5 illustrates the wireless use of the application.

As illustrated in FIG. 5, in an embodiment of the present invention, the system/invention can also be used in a wireless environment. The GUI implementations will vary depending on wireless device specifications and bandwidth. Maps are incorporated on devices with higher resolution displays. A keyword search and location can be provided as input or both can be determined automatically by links to the wired and use of wireless location technology, Using a Street Intersection Locator, specifying a street intersection can identify a Lasoo or using auto-location technology that enables usability for resource limited wireless devices. In an embodiment of the present invention, a wireless application can use a Smart Street ID to return a short list of eligible street intersections for a user to select the desired item. Results are displayed in a scrollable list, sorted by distance from the center of the Lasoo.

In an embodiment of the present invention, the invention delivers locally targeted advertising and information according to any specific location and/or demographic profile employing geo-location ad serving. In an embodiment of the present invention, the invention can automatically store and retrieve user preference information, such as selected location and search criteria, and enables users to modify preference data, dynamically filters categories not present in mapping area, and dynamically modifies category information presentation based on user selectable filters. The invention dynamically extends the searchable range of any individual record in a geo-coded database, enabling users to automatically locate records outside their specified search range that nevertheless have a logical local presence within a specified search range.

In an embodiment of the present invention, the invention enables database record owners to create date/time sensitive billboard "notes" that are automatically displayed in local content search results. The disclosed system and method automatically provide a geo-coded, searchable, web-page presence for all businesses and organizations in all major countries and markets worldwide. The system and method further enable record owners to enhance the display characteristics and content of their record(s) within a geo-coded database.

In an embodiment of the present invention, the invention provides seamless integration of wired and wireless capabilities, including automatic delivery and configuration of information to wireless devices, along with automatic detection of wireless device type. The system and method integrate seamlessly with automatic location determination capabilities of a wireless device, to automatically deliver location specific results and information to end-users. The system and method further automatically generate demographic profiling data by any user-defined region worldwide, greatly enhancing direct marketing capabilities while at the same time adhering to enhanced levels of privacy control.

In an embodiment of the present invention, the invention provides map navigation rollout controls that provide reduced display area footprints. Further, the system and method provide user controlled map functions enabling users to enhance and update map information for private or public use. The invention provides map functions and filters that enable users to select map display type, such as topological, vegetation, or interest-oriented.

Users can define desired search location by simply clicking on a map or choosing from drop-down list controls without requiring any typing. The invention searches and finds information records and their associated Web sites using a single, simple search interface. Searches are performed by advanced keyword combinations and provide an ability to perform "multi-tier" searches, wherein searches within searches are performed automatically.

In wireless embodiments of the present invention, the system further includes a Dynamic Location Sensitive Auto Search Module (DLSASM) for automatically re-configuring the position of a user's STT on a wireless device as the user's position changes while the wireless unit is being transported. The automatically repositioned STT includes a refreshed set of characteristics and attributes derived from other features and modules.

In wireless embodiments of the present invention, a Wireless Automatically Configured Search Module (WACSM) enables a user to configure a local search engine to conform from a user's wired desktop browser to the characteristics of a wireless device. Further, the WACSM automatically downloads this configuration information, along with the user's search preferences to the wireless device whenever the user activates the wireless unit.

In an embodiment of the present invention, in order to facilitate local searching, a Spatial Information Favorites Module (SIFM) permits users to record their favorite search locations, by having the system memorize a currently selected location on the map or from the gazetteer.

Adding new information to the Internet has been a bureaucratic and often intimidating process for most Internet Users and is normally associated with a fee. The invention enables users, including private individuals, businesses and organizations, to add new content to the Internet by simply clicking on a map and posting their own information. Coupled with this is an ability to have a calendar and/or bulletin board feature associated with an entry.

The invention includes an integrated wired and wireless geo-spatial search solution, including a capability to automatically 'load' a wireless device with data, set-up and user preference information defined and obtained from the wired side. This enables a user to employ both wired and wireless Internet-capable devices to conduct geo-spatial searches. The invention enables the delivery of information targeted to specific locations and demographic profiles, using the invention's client positioning capabilities, regardless of how or where the client accesses the Internet.

Figure 6:
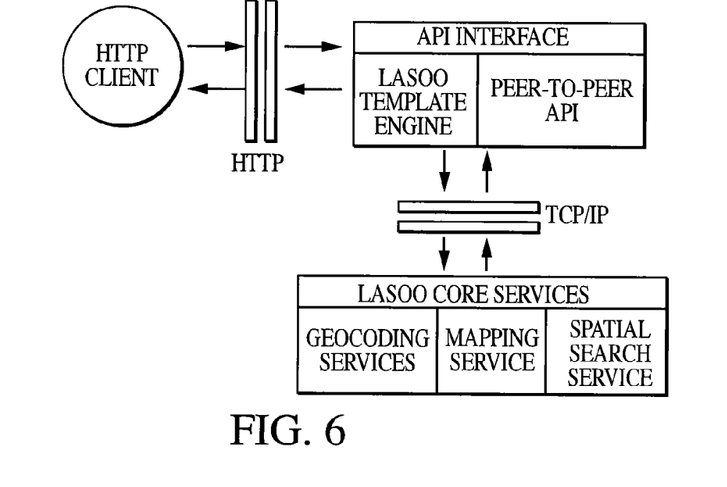
FIG. 6 is a simplified overview of logical architecture according to an embodiment of the present invention.
Figure 7:
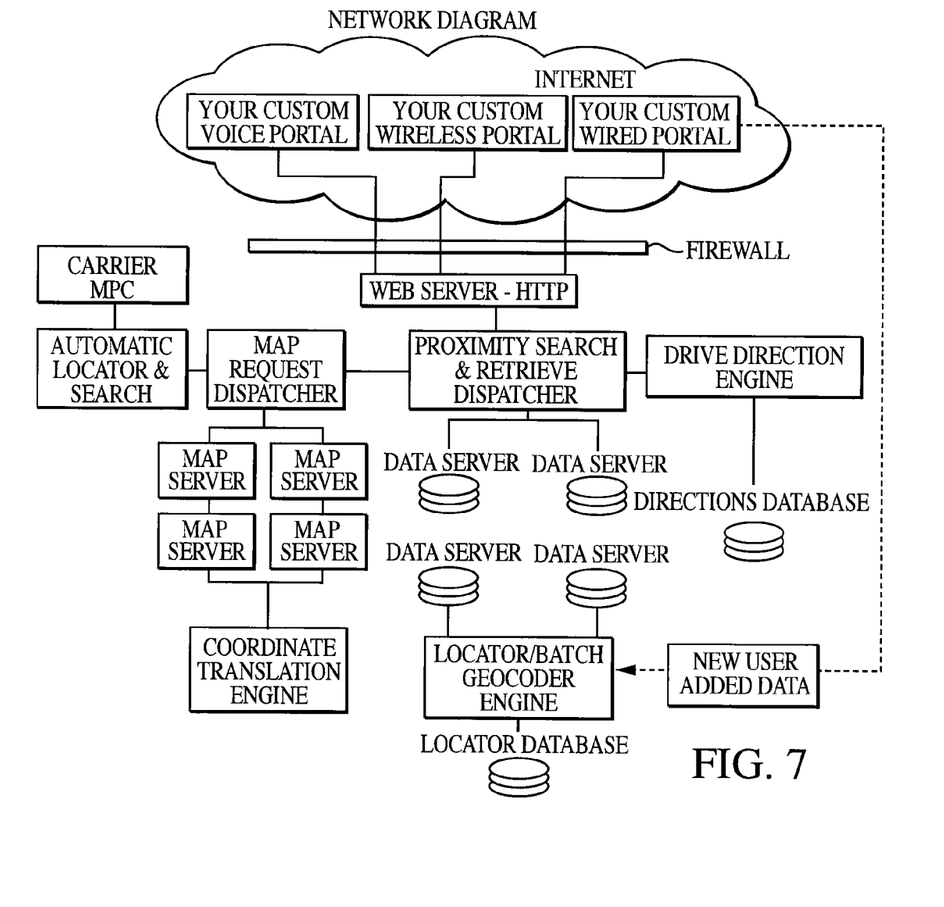
FIG. 7 is an overview of the system according to an embodiment or the present invention.

FIG. 6 Illustrates a simplified overview of the logical architecture for the system. The "Geocoding Service" is responsible for converting a conceptual location specification, such as street address, into a precise longitude/latitude value, which in turn can be used to form a mapping/search request that is centered on that value. The "Mapping Service" provides the list of points that are plotted over the background map based on their proximity to a point of interest and other attribute criteria, such as datum category or similarity to a search string. The "Lasoo Template Engine" and the appropriate template are responsible for delivering an interactive interface, including the plotting of points over the map image backdrop. FIG. 7 illustrates an overview of the system.

The invention provides detailed mapping and local content capability worldwide, including the unique ability to specify a dynamic adjustable search range for each individual geo-located record. The invention's dynamic category/content filtering capabilities enable the presentation to an end-user of solely the sub-set of categories and content relevant to the user's specified search criteria and search location.

The invention enables search engines the world over to be automatically geo-location/local content enabled by virtue of the capabilities of the IDLCM. The invention provides for user insertion and modification of geo-coded content within a worldwide Internet searchable database, and enables users to specify a precise search location without requiring address information. The invention enables users to create and deploy advertising and information banners/announcements to targeted, local audiences, anywhere in the world. In experimentation, the system was able to searches and find in excess of 10,000 records spatially in less than 0.5 seconds, providing a very fast result.

The invention removes the barriers to finding local content quickly and easily. The invention solves the problem of requiring specific postal code or other positional information in order to conduct a search for local content by providing simple 'point and click' entry to begin a search anywhere in the world. The invention provides scalability and reliability, delivering comprehensive, targeted and customizable geo-coded local content, based on a user's actual or preferred location anywhere in the World, to any wired or wireless Internet device.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. An information retrieval method employing spatially selective features, the method comprising:
   (i) receiving a search request from a user, the search request defining a search area and user locating information;
   (ii) automatically defining a minimum search area needed to locate and retrieve a minimum, specified number of search results;
   (iii) in a geo-coded database including a plurality of records, each record being associated with a database record owner and including advertising information associated with the database record owner, and each record having geo-locating information including a defined search area availability, indexing records beyond the defined minimum search area for the respective records;
   (iv) automatically searching and retrieving records in the database, commencing at a specified point and extending over a search area beyond the defined search area availability of at least one record and automatically extending the search until one or more records are located;
   (v) creating a dynamic set of categories to present to the user;
   (vi) evaluating records and automatically determining an appropriate default search area to ensure the provision of search results in all appropriate categories of the set of categories;
   (vii) displaying the search results as tabular and graphical information on a display page, wherein the tabular information includes prioritized information, wherein the tabular and graphical information are linked; wherein the graphical information comprises graphical representations of the search location, the determined geo-spatial distance, and the search results on a map display; and wherein the graphical representations of the search location comprise points indicating the location of the search results on the map display;
   (viii) determining if one or more points overlap; and
   (ix) selecting at least two of the overlapping points to combine into a single larger point to eliminate the overlap.

2. The method of claim 1 wherein the automatically extending the search until one or more records are located, comprises:
   automatically extending the search until a number of records exceeds a pre-defined threshold value.

3. The method of claim 1 further comprising:
   receiving a record update for a specified record from the database record owner; and
   updating the specified record in response to the received record update.

4. The method of claim 1 wherein the search area comprises a geographic polygon.

5. The method of claim 1 wherein the receiving a search request comprises at least one of receiving a keyword search request, a category search request, a user click on a map display interface, a cookie holding location information, a geo-position from a wireless device, or combinations thereof.

6. The method of claim 1 wherein the search request comprises a conceptual location specification.

7. The method of claim 6 further comprising:
   converting the conceptual location specification into longitude and latitude values for use in determining the geo-spatial distance from the search location.

8. The method of claim 1 wherein the prioritized information comprises prioritizing the search results according to at least one of a top-of-list promotion, a spatial alert, and a pay-per-ad restriction.

9. The method of claim 1 further comprising:
   receiving a database search request from a database user;
   detecting user-specific information associated with the database user; and
   customizing the search results according to the user-specific information.

10. The method of claim 9 wherein detecting user-specific information comprises:
    reading a cookie received with the search request; and
    processing the cookie to retrieve the user-specific information.

11. The method of claim 9 wherein customizing the search results comprises:
    prioritizing the search results according to a business promotion.

12. The method of claim 9 wherein customizing the search results comprises:

customizing a mapping icon for presentation of the search results.

13. The method of claim 1 wherein the graphical representation of the determined geo-spatial distance comprises a circle on the map display.

14. The method of claim 1 wherein the geo-locating information comprises latitude and longitude coordinates.

15. The method of claim 1 wherein the defined search area availability comprises a specified distance radially extending from a specified latitude and longitude coordinates, wherein the distance represents a geographic range within which a record may be located and retrieved.

16. The method of claim 1 wherein the user selects a search result on the display page, the displaying further comprising:
displaying a pop-up, wherein the pop-up provides additional information relating to the selected search result.

17. The method of claim 1 wherein the linked tabular and graphical information comprises:
linking the information via color, via geometry, or combinations thereof.

* * * * *